(12) United States Patent
Barth

(10) Patent No.: US 9,381,474 B2
(45) Date of Patent: Jul. 5, 2016

(54) APPARATUS FOR FOAMING A LIQUID

(71) Applicant: Volker Barth, Offenbach am Main (DE)

(72) Inventor: Volker Barth, Offenbach am Main (DE)

(*) Notice: Subject to any disclaimer, the term of this patent is extended or adjusted under 35 U.S.C. 154(b) by 0 days.

(21) Appl. No.: 14/164,226

(22) Filed: Jan. 26, 2014

(65) Prior Publication Data

US 2015/0061165 A1   Mar. 5, 2015

Related U.S. Application Data

(63) Continuation-in-part of application No. PCT/EP2012/003163, filed on Jul. 26, 2012.

(51) Int. Cl.
*B01F 3/04* (2006.01)
*A47J 31/44* (2006.01)
*A47J 43/12* (2006.01)

(52) U.S. Cl.
CPC ......... *B01F 3/04446* (2013.01); *A47J 31/4485* (2013.01); *A47J 43/126* (2013.01); *B01F 3/04524* (2013.01)

(58) Field of Classification Search
CPC . A47J 31/4485; A47J 43/126; B01F 3/04446; B01F 3/04524
USPC .............................. 261/34.1, 95, 157, DIG. 26
See application file for complete search history.

(56) References Cited

U.S. PATENT DOCUMENTS

| | | | |
|---|---|---|---|
| 2,090,727 A * | 8/1937 | Gosmann | 261/94 |
| 3,199,790 A * | 8/1965 | Giesemann | 239/428 |
| 3,209,554 A | 10/1965 | McManus | |
| 3,713,841 A * | 1/1973 | MacManus | 426/474 |
| 3,974,965 A * | 8/1976 | Miller | 239/413 |
| 4,038,037 A * | 7/1977 | Wilmsen | 422/133 |
| 4,103,876 A * | 8/1978 | Hasselman et al. | 366/173.1 |
| 4,162,128 A * | 7/1979 | Ogden et al. | 366/158.5 |
| 4,207,202 A * | 6/1980 | Cole, Jr. | 261/28 |
| 4,213,936 A * | 7/1980 | Lodrick | 422/133 |
| 4,597,980 A * | 7/1986 | Bottcher et al. | 426/568 |
| 4,925,109 A * | 5/1990 | Flanagan et al. | 239/429 |
| 4,993,599 A | 2/1991 | Gruenewald | |
| 5,738,002 A | 4/1998 | Marano-Ducarne | |
| 7,318,581 B2 * | 1/2008 | Robards et al. | 261/59 |
| 2006/0013062 A1 * | 1/2006 | Gembala | 366/101 |
| 2010/0075007 A1 | 3/2010 | Schindler | |

FOREIGN PATENT DOCUMENTS

| | | |
|---|---|---|
| DE | 20 2004 014 737 U1 | 3/2006 |
| DE | 20 2007 012 767 U1 | 3/2009 |
| DE | 10 2007 045 266 A1 | 4/2009 |

(Continued)

*Primary Examiner* — Charles Bushey
*Assistant Examiner* — Scott Bushey
(74) *Attorney, Agent, or Firm* — Klaus J. Bach

(57) ABSTRACT

In an apparatus for foaming a liquid with an aerating device by which the liquid can be aerated, an outlet arrangement which is in communication with the aerating device via a conduit and a pump arranged in the conduit for transporting the aerated liquid from the aerating device to the outlet arrangement, at least one flow resistor is provided in the conduit or the outlet arrangement which includes a plurality of adjacent resistor elements of an elastic material which are movable relative to one another and between which there are passages through which the aerated liquid is forced whereby a high quality stable foam is generated and a pump control arrangement is provided for maintaining the aerated liquid under pressure.

11 Claims, 8 Drawing Sheets

(56) References Cited

FOREIGN PATENT DOCUMENTS

| | | |
|---|---|---|
| DE | 10 2008 012 525 A1 | 9/2009 |
| DE | 10 2008 058 934 A1 | 8/2010 |
| EP | 0077652 A1 * | 4/1983 |
| EP | 2 298 142 A1 | 3/2011 |
| GB | 2060420 A * | 5/1981 |
| WO | 2011/028117 A1 | 3/2011 |

* cited by examiner

APPARATUS FOR FOAMING A LIQUID

This is a Continuation-In-Part application of pending international patent application PCT/EP2012/003163 filed Jul. 26, 2012 and claiming the priority of German patent application 10 2011 108 810.9 filed Jul. 29, 2011.

BACKGROUND OF THE INVENTION

The invention resides in an apparatus for foaming a liquid comprising an aerating device by which the liquid can be aerated, an outlet arrangement which is in communication with the aerating device via a conduit and a pump for transporting the aerated liquid from the aerating device to the outlet arrangement.

Such an apparatus is known for example from DE 10 2008 058 934 A1. In this known apparatus, a sieve is disposed in the outlet nozzle through which the already foamed liquid passes. In this way, large air bubbles contained in the foam are destroyed and, dependent on the mesh width of the sieve, small air bubbles are formed. With the small air bubbles a stable foam is formed.

Even though a high quality foam can be produced with the known apparatus the inventor considered the apparatus in need of improvement.

It is therefore the object of the present invention to provide an apparatus of the type referred to above which permits the manufacture of a high-quality stable foam.

SUMMARY OF THE INVENTION

In an apparatus for foaming a liquid comprising an aerating device by which the liquid can be aerated, an outlet arrangement which is in communication with the aerating device via a conduit and a pump arranged in the conduit for transporting the aerated liquid from the aerating device to the outlet arrangement, at least one flow resistor is provided which comprises a plurality of adjacent resistor elements of an elastic material which are movable relative to one another and between which there are passages through which the aerated liquid is forced whereby a high quality stable foam is generated.

The invention is based on the recognition that, with increasing pressure of the aerated liquid conducted to the flow resistor, the resistor elements present in the flow resistor are densified and, as a result, the cross-section of the passages between the resistor elements decreases. When the pressure of the aerated liquid which is supplied to the flow resistor decreases, the resistor elements loosen up because of their elasticity and/or because of turbulence which occurs during passage of the aerated liquid through the passages in the resistor elements. In the process, the cross-section of the passages formed between the resistor elements increases. Upon passage of the aerated liquid through the flow resistor therefore a very fine-pore stable foam is generated. This foam has a high quality. The elasticity of the flow resistor is preferably so adapted to the pumping pressure of the pump that the aerated liquid, upon flowing through the flow resistor, exerts on the flow resistor a force of 1 Newton to 400 Newtons.

In a preferred embodiment of the invention, the flow resistor is arranged in the outlet arrangement. Then the apparatus produces a particularly fine homogenous foam.

It has been found to be particularly advantageous if the resistor elements are granular. The flow resistor can then be produced at low cost. The granular particles have preferably a shape other than sphere-like, for example, an essentially oval shape and/or a rectangular shape. The individual granular particles may have different geometries and/or different dimensions. The length of the granular particles is preferably in the area of 0.5 to 3.5 mm, in particular, 0.5 to 1.2 mm. The surface of the granular particles has preferably edges, steps or a roughness. The surface of the granular particles however may also change continuously. The granular particles consist preferably of plastic material which has a hardness of 28-100 shore.

It is advantageous if the pump is a displacement pump and also if the flow resistor is arranged between the pump and the outlet arrangement, in particular between the pump and a heating apparatus arranged in the conduit for heating the aerated liquid. In the process, pressure peaks in the aerated liquid, which may occur when the displacement pump pumps the aerated liquid in a non-uniform manner, are smoothened by the flow resistance. Herein, the flow resistance provides for a more homogeneous foam supply at the outlet arrangement wherein in particular spattering is avoided. The displacement pump may in particular be a hose pump, a shaft pump or a diaphragm pump. The arrangement according to the invention however may be provided with any other type of pump, in particular a gear pump or a rotary sliding vane pump.

If needed a check valve may be arranged in the duct between the pump and the flow resistor which check valve is pervious for a flow from the aerating arrangement to the outlet arrangement. With this feature, a uniform foam discharge at the outlet arrangement can also be achieved.

In a preferred embodiment of the invention, the heating apparatus is in the form of a low pressure boiler, wherein a controllable outlet valve is arranged between the heating apparatus and the outlet arrangement and wherein the outlet valve is in communication with a control arrangement for maintaining the aerated liquid in the heating apparatus at a pressure of 0.5 bar to 4 bar, in particular 1 bar to 3 bar.

The pressure is preferably present also when the pump is switched off. This can be achieved in that the outlet valve is closed by the control arrangement before the pump is shut down so that the aerated liquid is then captured in the duct volume between the check valve and the outlet valve. In this way, it is prevented that, when the apparatus is used as a milk foaming device, the aerated milk forms a skin and/or lactate deposits which could clog the flow resistor.

In an advantageous embodiment of the invention, the resistor elements are in a fiber-like form and interconnected to an elastically deformable wool. Herein the fiber-like resistor elements consist preferably of an elastic temperature-resistant material, in particular of a metallic material. The individual fibers have different cross-sectional dimensions. In particular, the cross-sectional dimensions of the individual fibers may change from one end to the other of the fiber.

In another preferred embodiment of the invention, the resistor elements consist of a natural material in particular of coco fiber and/or hair. In that case, the resistor elements can be disposed of after use in a simple environmentally non-polluting manner.

In another advantageous embodiment, the resistor elements are formed by chips or sections of chips which, in a longitudinal direction, have an essentially constant cross-section. The chips have preferably a cross-sectional configuration which differs from a circular shape, in particular an angled cross-sectional shape. The width of the chips may be between 0.2 mm and 3 mm and preferably between 0.3 mm and 1 mm. The thickness of the chips may be between 0.2 mm and 0.6 mm. Test results have shown that, with such chips, a particularly fine-pore and stable foam can be generated. The chips can be produced for example by means of a milling machine with accurately defined cross-sectional dimensions. In this way, the production of a foam of uniformly high quality is ensured.

It is also advantageous if the resistor elements consist of a plastic material, in particular of polytetraflouroethylene, polyoxymethylene (POM) or polyamide (PA). In this way, the required elasticity of the resistor elements can be ensured even at high temperatures.

In a preferred embodiment of the invention, the resistor elements are enclosed between foraminous plates or sieves which are arranged in the conduit in spaced relationship and which are oriented transverse to the longitudinal direction of the conduit and which furthermore can be moved out of a rest position toward one another for compressing the resistor elements. Herein, the foraminous plate or sieve which is further remote from the aerating arrangement forms an abutment-stop, against which the resistor elements the resistor element are positioned when exposed to the pressure of the aerated liquid.

By the foraminous plates or sieves the resistor elements are prevented on one hand from escaping from the space between the two foraminous plates or sieves as the cross-sectional dimensions of the openings in the foraminous plates or the sieves are adapted to the dimensions of the resistor elements so that the resistor elements cannot pass through the openings. On the other hand, the pressure of the aerated liquid generated by passing through the flow resistor can be transferred via the foraminous plates or sieves to the resistor elements so that the resistor elements are compressed by the flow resistance.

It has been found to be particularly advantageous if the passage cross-section of the inlet-side foraminous plate or sieve is smaller than the passage cross-section of the outlet-side foraminous plate or sieve. In this way, the resistor elements are compressed or densified by the pressure of the aerated liquid to a larger degree.

In a further embodiment of the invention, the resistor elements and possibly the foraminous plates or sieves are arranged, in the interior of a cartridge which is mounted removably in the conduit and/or on the outlet arrangement. The resistor elements and, if applicable, the foraminous plates or sieves can then be exchanged in a simple manner together with the cartridge and replaced by a spare part. The flow resistance can be maintained in this way in a simple and clean hygienic manner. The cartridge has preferably an outer diameter of about 5-50 mm and an axial length of 4-60 mm.

Below, exemplary embodiments of the invention will be described in greater detail on the basis of the accompanying drawings.

DESCRIPTION OF EXEMPLARY EMBODIMENTS

Figure 1:
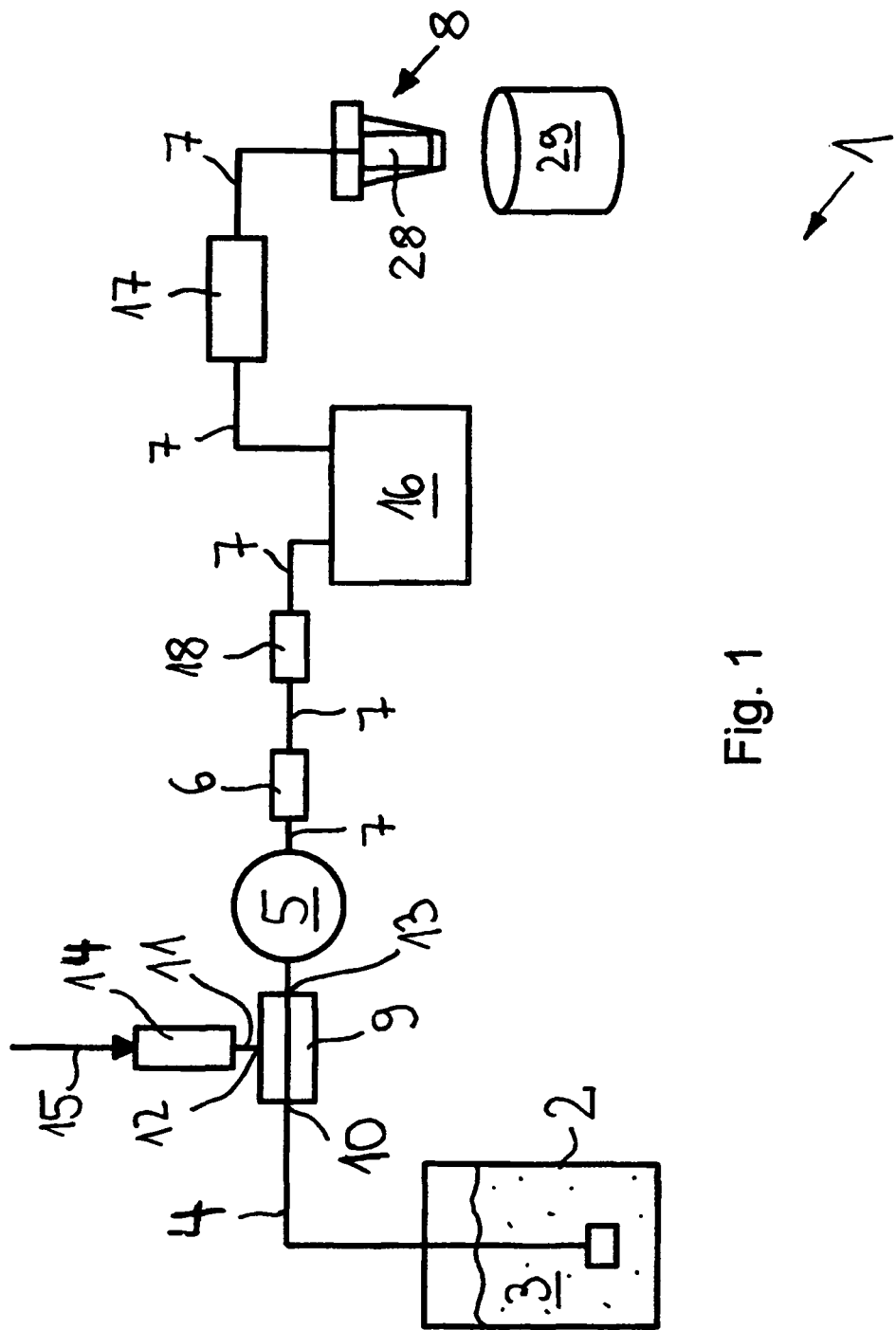
FIG. 1 shows a schematic block representation of the apparatus according to the invention.

An apparatus for foaming a liquid designated in FIG. 1 overall with the reference numeral 1 includes a storage container 2 for milk 3. The milk 3 can be cooled by a cooling arrangement, which is not shown in the drawing, to about 6° C. to avoid bacterial growth in the container 2.

The storage container 2 is connected via a suction line 4 to a suction opening of a displacement pump 5 which is preferably on the form of a hose pump. At its end remote from, the pump 5 which end is immersed into the milk 3 the suction line 4 includes a check valve 6 which opens in the pumping direction of the pump 5 but blocks flow in the opposite direction.

The pump 5 is at its outlet connected to an outlet arrangement 8 via another conduit 7, so that milk 3 can be supplied by means of the pump 5 from the storage container 2 to the outlet arrangement 8.

Figure 2:
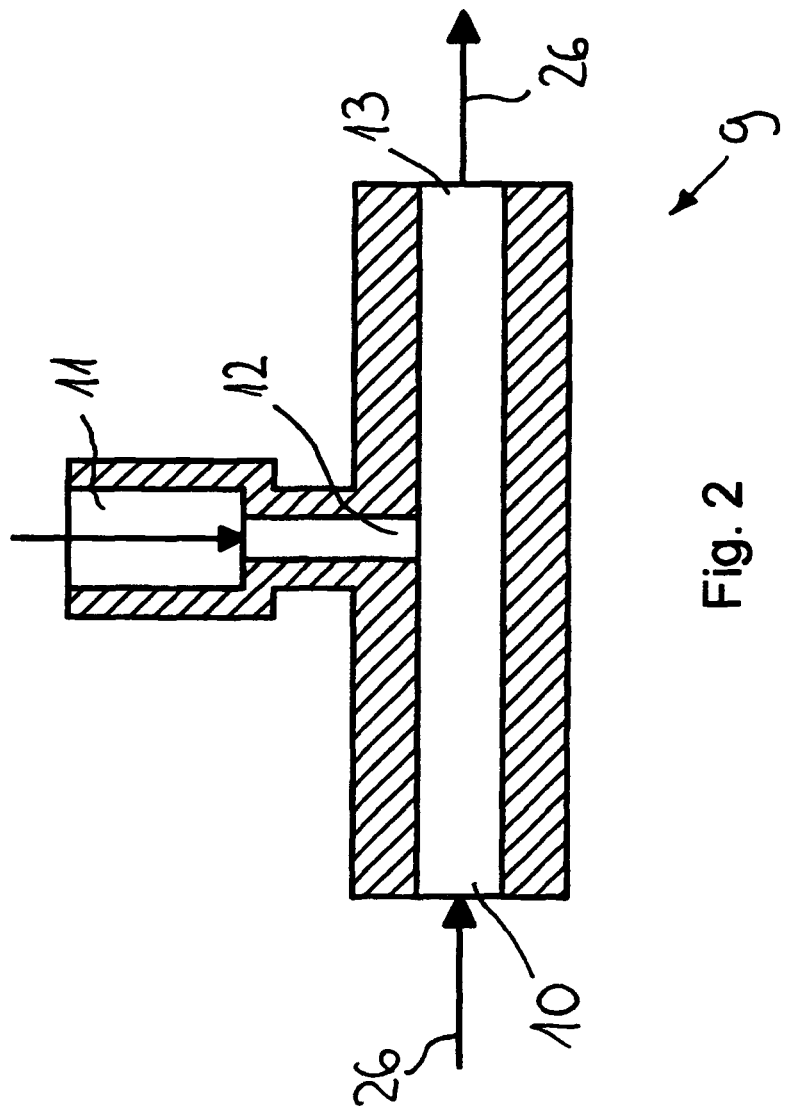
FIG. 2 shows an aerating component for aerating a liquid in a longitudinal cross-section.
Figure 3:
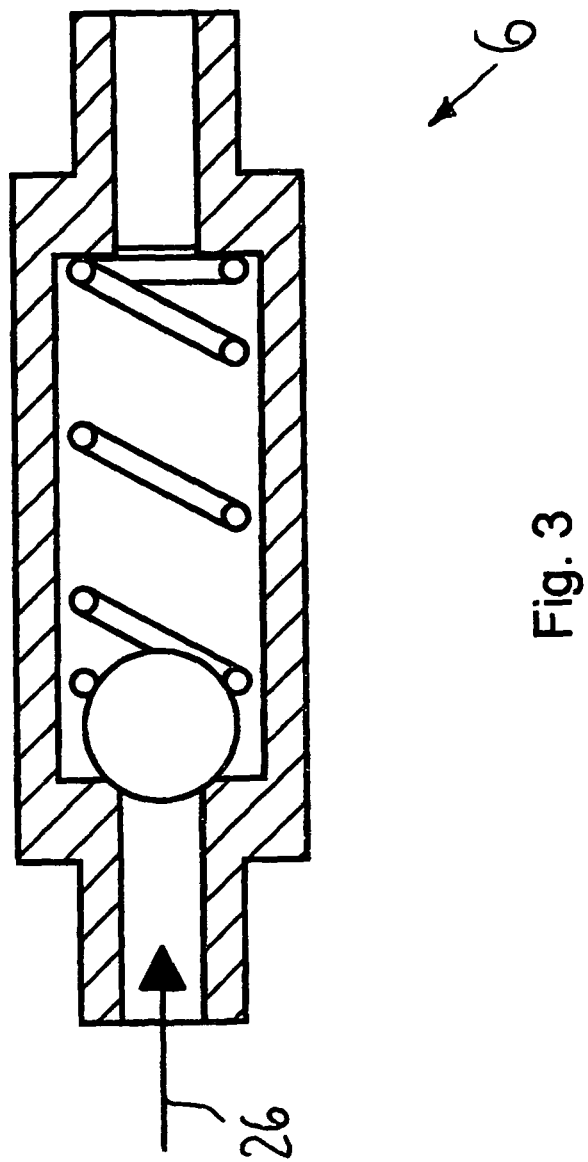
FIG. 3 is a cross-sectional view of a check valve.

In the suction line 4, an aerating device 9 is arranged which is shown in greater detail in FIG. 2 and which includes a first inlet opening 10 connected to the suction line 4 for supplying milk, a second inlet opening 12 connected to an air supply line 11 for supplying air and an outlet opening 13 connected to the conduit 7. Via the second inlet opening 12 air is supplied to the milk 3 in a direction transverse to the flow direction of the milk so that the air is mixed with the milk 3.

The air supply line 11 includes an adjustable air control valve 14. The connection of the air control valve facing away from the aerating device 9 is connected to a supply line 15 whose inlet opening is so arranged that no contaminated air is sucked in. In the supply line 15, an activated charcoal filter may foe arranged.

The conduit 7 includes a heating device 16 for heating the aerated liquid. The heating device is in the form of a low pressure boiler with a liquid storage volume of 0.4 liter. The operating pressure in the low pressure boiler is preferably between 2.4 bar and 4 bar. In the heating device 16, a heating coil is arranged which is not shown in the figure and through which aerated milk 3 is conducted. In the interior of the heating device 16, a heat carrier which is heated to a predetermined temperature is arranged, which transfers its heat via the heating coil to the milk conducted through the heating coil. The line 7 furthermore includes an electromagnetic outlet valve 17 by which the flow of milk can be interrupted Between the outlet valve 17 and the heating device 16, a first flow resistor 18 is arranged in the conduit 7 so that aerated milk flows therethrough. The first flow resistor 18 is mounted in the conduit 7 by a screw coupling which is not-shown but which permits its removal.

Figure 4:
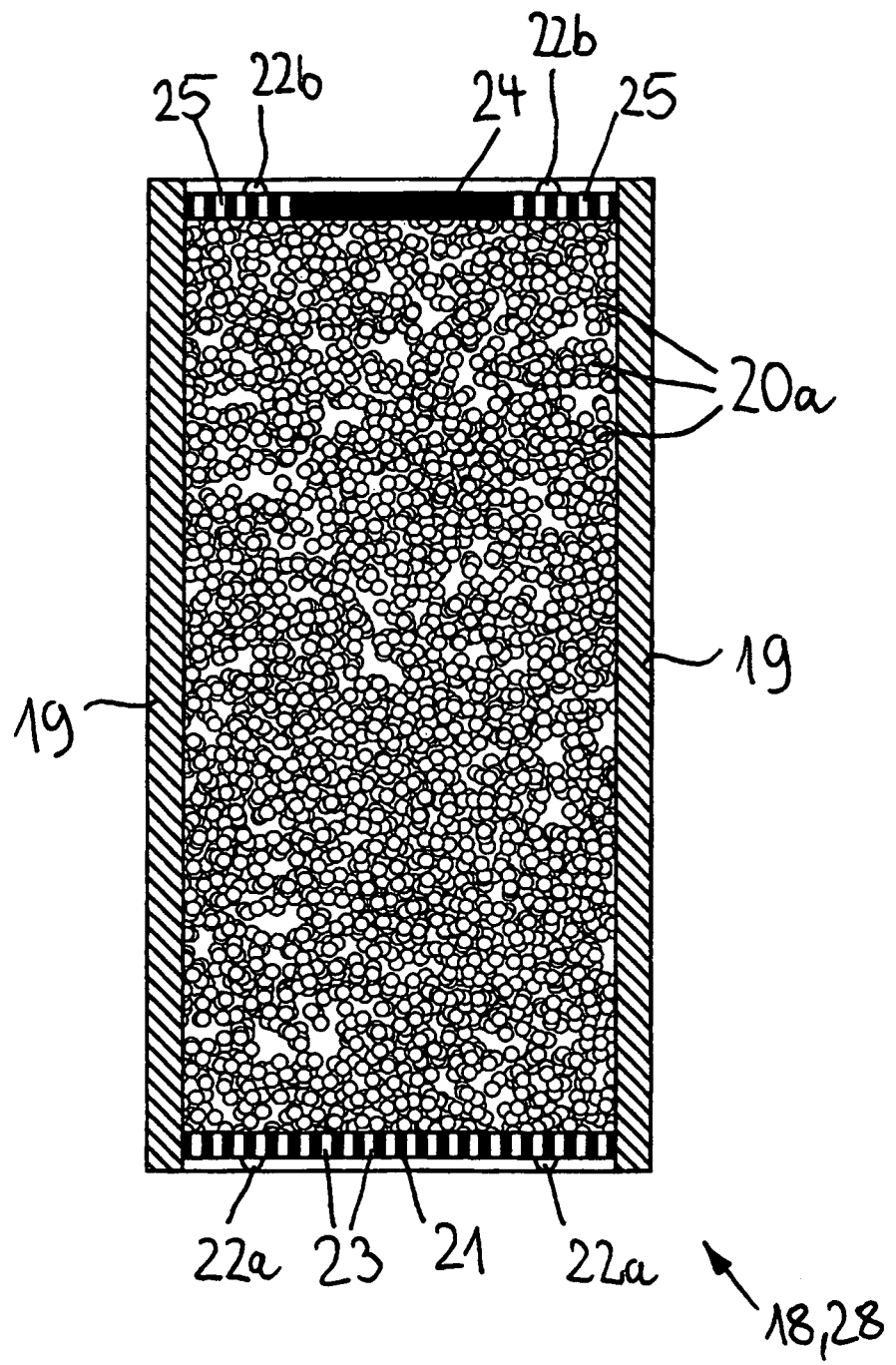
FIG. 4 is a cross-sectional view of a first embodiment of a cartridge with an integrated flow resistor.

As apparent from FIG. 4, the first flow resistor IS comprises an about cylindrical cartridge 19 whose cross-sectional dimensions correspond about to the internal cross-sectional dimensions of a section of the conduit 7 in which the flow resistor 18 is arranged. The cartridge 19 has an about tubular circumferential wall defining an inner opening in which as resistor elements 20a a plurality of elastic granular particles of plastic are arranged, which form a bulk material in which neighboring granular particle abut one another loosely. The cartridge is filled with the bulk material in such a way that the granular particles within the inner opening of the cartridge 19 are movable relative to one another. Between the granular particles passages are formed through which the aerated milk can flow.

Figure 5:
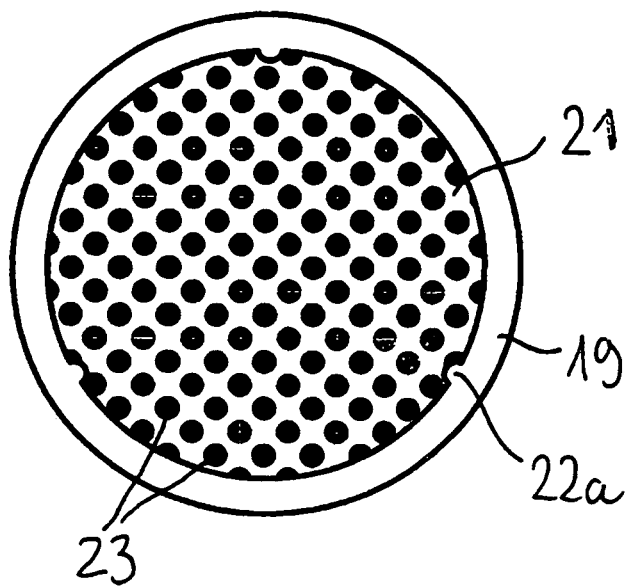
FIG. 5 is a top view of the outlet end of the flow resistor.

The cartridge 19 has a first front wall formed by a first foraminous disc 21. The first front wall extends in a plane which extends normal to the longitudinal center axis of the circumferential wall of cartridge 19. The edges of the first foraminous disc 21 butt against the inner surface of the circumferential wall of the cartridge 19. As shown in FIGS. 1 and 5, the circumferential wall of the cartridge 19 is provided at the inner surface thereof with circumferentially spaced first projections 22a on which the first foraminous disc 21 is supported.

FIG. 5 shows that the first foraminous disc 21 has a plurality of openings 23 for the passage of milk foam. The width of the openings 23 is smaller than the dimensions of the resistor elements 20a so that those do not fit through the openings 23 of the first foraminous disc. It is apparent from FIG. 4 that the resistor elements 20a or supported on the first foraminous disc 21.

Figure 6:
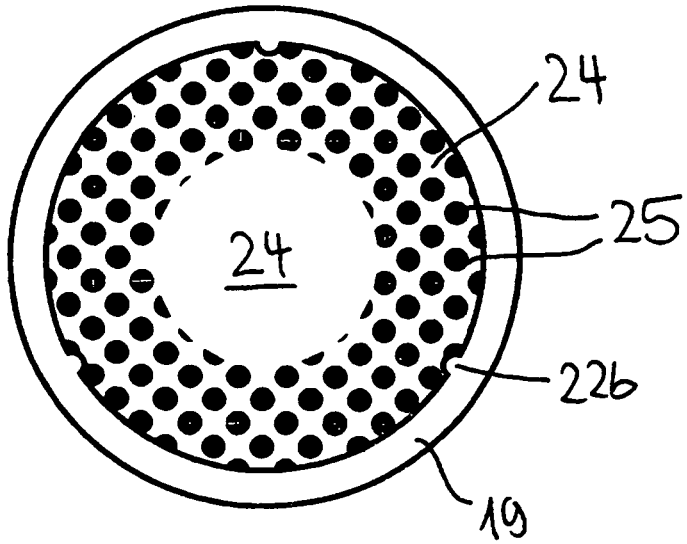
FIG. 6 is a top view of the inlet end of the flow resistor.

At the supply end remote from the first foraminous disc 21, the cartridge 19 is provided with a second front wall formed by a second foraminous disc 24 which extends parallel to the first front wall and is axially spaced from the first front wall with the bulk material 20a disposed therebetween. The edge of the second foraminous disc 24 butts against the inner surface of the circumferential wall of the cartridge 19. As shown in FIG. 6, the circumferential wall of the cartridge 19 is provided at its inner side with several circumferentially spaced second projections 22b which extend inwardly over the second foraminous disc 24.

FIG. 6 shows that the second foraminous disc 24 has a plurality of second openings 25 for the passage of the aerated milk 3. The opening width of the second openings 25 is smaller than the corresponding dimension of the resistor elements 20a so that those do not fit through the second openings 25 but are enclosed between the foraminous plates 21, 24. As shown in FIG. 4, the second foraminous disc 24 is disposed on top of the bulk material 20a. The second openings 25 are arranged in an annular area of the second foraminous disc 24 which surrounds a central circular area of the second foraminous disc 24 in which no openings 25 are provided. The second foraminous disc 24 serves as a baffle plate. As a result, a larger part of the pressure forces generated by the pump is transmitted to the second foraminous disc 24 than to the first foraminous disc 21.

Figure 7:
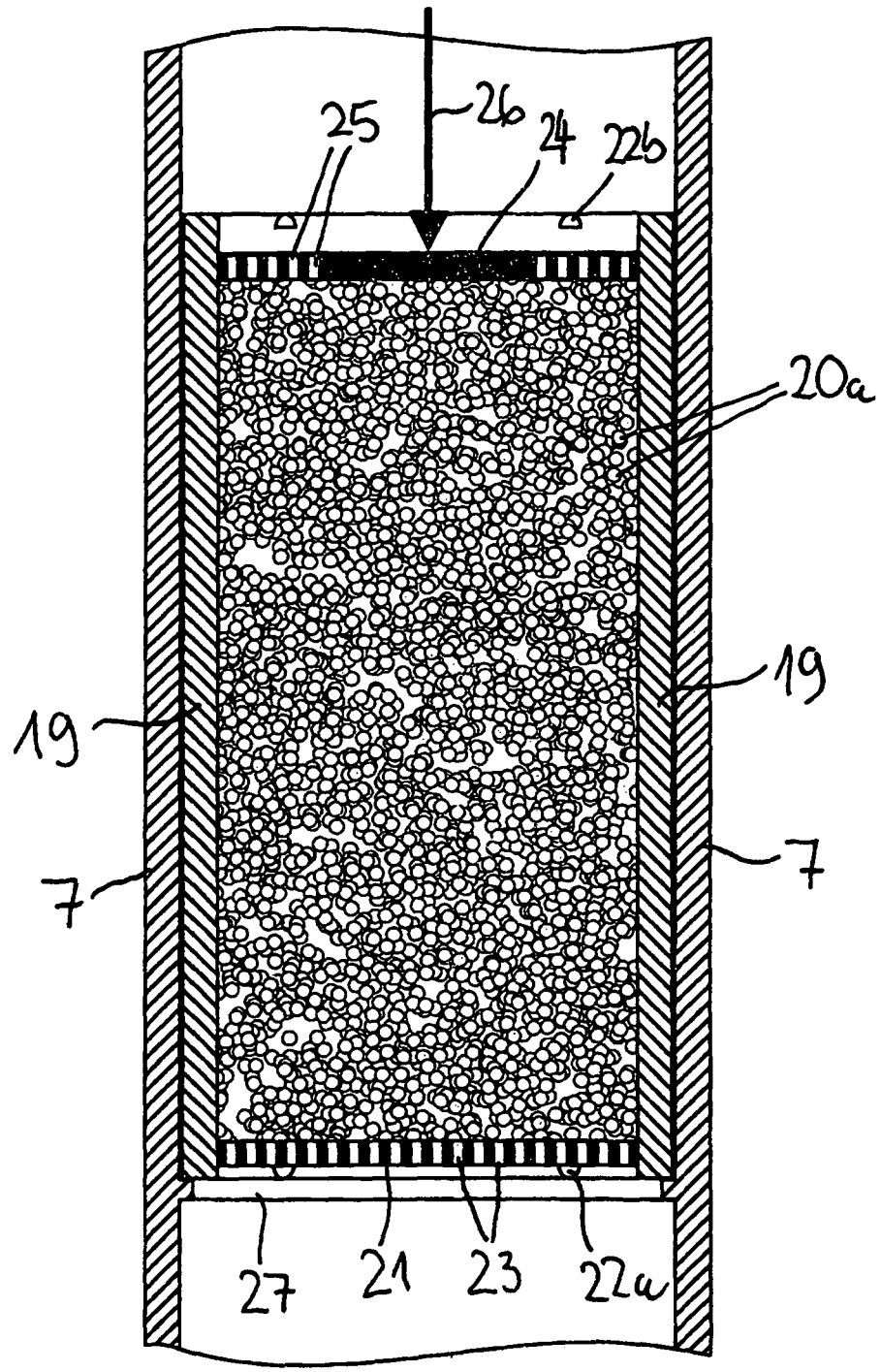
FIG. 7 is a cross-sectional view of the flow resistor shown in FIG. 4, wherein the flow resistor is installed in a conduit.

From FIG. 7, it is apparent that the cartridge 19 is supported at its outlet end on a support 21 provided on the inner wall of the conduit 7. By comparison of FIG. 4 with FIG. 7, it becomes clear that the second foraminous disc 24 is axially movable in the cartridge 19 and is moved in the cartridge 19 toward the first foraminous disc 21 as a result of the flow resistance of the liquid flowing through the cartridge 19. As a result, the foraminous disc 21 presses with a force of about 50 Newton to 200 Newton against the first flow resistor 18 so that the bulk material is compressed when the aerated milk 3 flows through the flow resistor 18. By the first flow resistor 18, the pressure pulses in the aerated milk which are generated by the pump 5 are weakened.

In the outlet arrangement 8, a second flow resistor 28 is arranged by which a very fine stable milk foam is generated from the aerated milk 3 and is supplied to a cup 29 arranged below the outlet arrangement 8. The outlet arrangement 8 consists of two parts with one part being provided at the interface between the two parts with a cavity in which the second resistor 28 is arranged. In this way, the second resistor 28 can be removed from, or respectively installed in, the outlet arrangement 8 in a simple manner.

The outlet arrangement 8 is provided with a second support which is not shown in the drawings but on which the second flow resistor 28 is supported. By the second support, the second flow resistor 28 is prevented from being displaced in the outlet arrangement 8 in the flow direction of the milk.

In a first exemplary embodiment, the second flow resistor 28 is of the same design as the first flow resistor 18.

Figure 8:
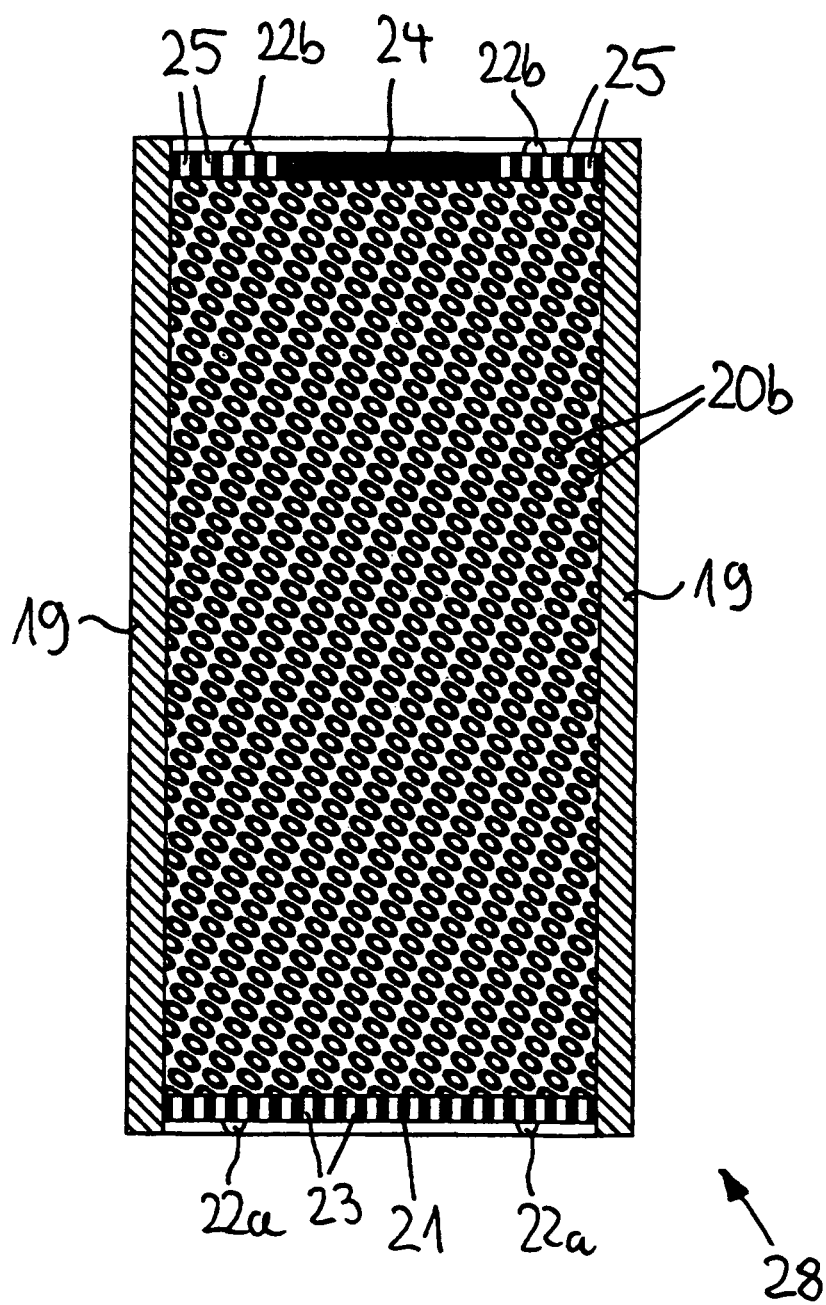
FIG. 8 is a longitudinal cross-sectional view of a second embodiment of the flow resistor.

In a second exemplary embodiment, the second flow resistor 28 includes, in place of the bulk material, an elastically deformable chip of plastic (FIG. 8). The resistor elements 20b are formed thereby by sections of the chip which are arranged behind one another and which are movable relative to one another. Alternatively, the resistor elements 20b may also be formed as separate chips 20b. The chip has an about rectangular cross-section with at width of 2.5 mm and a thickness of 0.5 mm.

The resistor elements 20b are arranged in a cartridge IS between the foraminous discs 21, 24. The cartridge 19 of the second exemplary embodiment corresponds to that of the first-exemplary embodiment. Also, the foraminous discs 21, 24 of the second exemplary embodiment are of the same design as those of the first exemplary embodiment. The earlier description is correspondingly also valid for the second exemplary embodiment.

Figure 9:
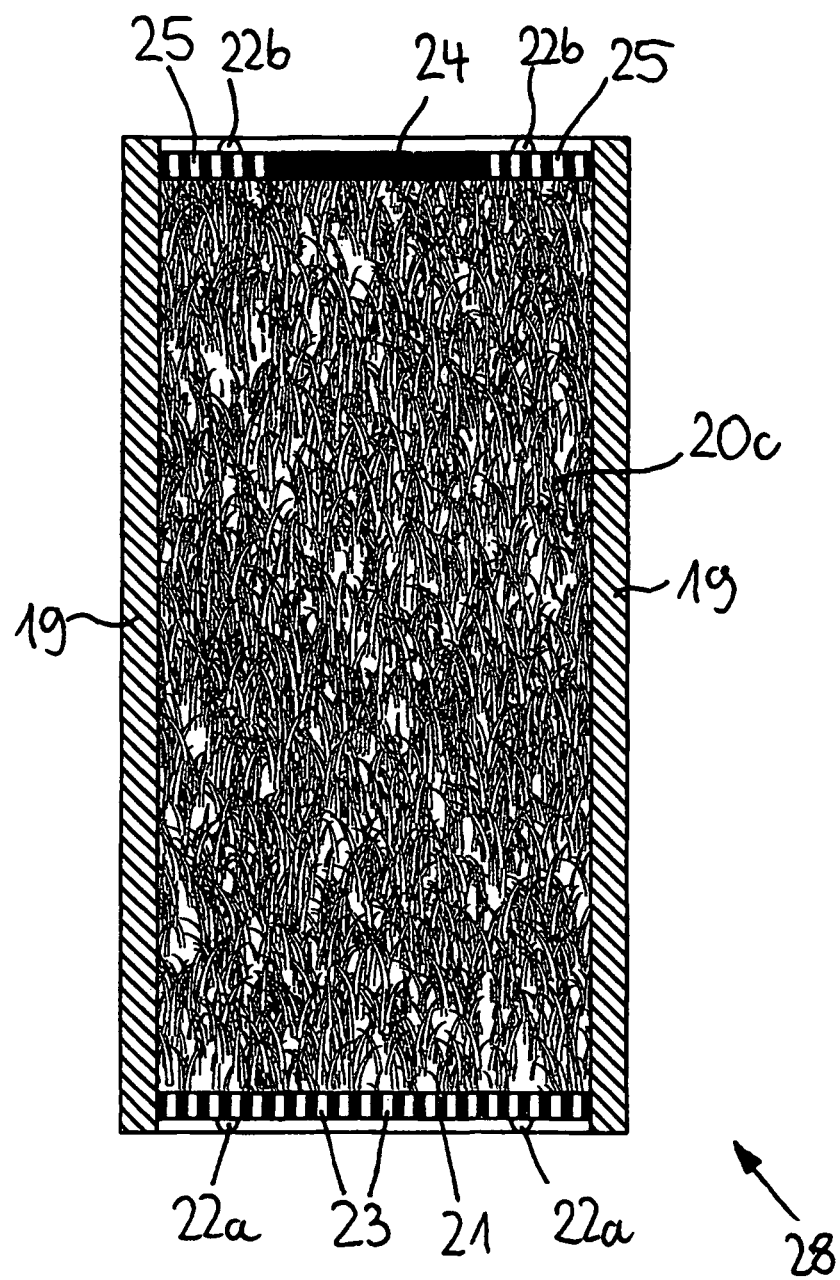
FIG. 9 is a cross-sectional view of a third embodiment of the flow resistor.

In a third exemplary embodiment of the invention, the second flow resistor 28 includes fiber-like resistor elements 20c which form a wool or fleece (FIG. 9). Herein the resistor elements 20c consist of coco fibers. The resistor elements 20c are arranged in a cartridge 19 between foraminous discs 21, 24. The cartridge 19 of the third exemplary embodiment is of the same design as that of the first exemplary embodiment. Also the foraminous discs 21,25 of the third exemplary embodiment are of the same design as those of the first exemplary embodiment The earlier description consequently also applies to the third exemplary embodiment.

For controlling the apparatus, a control arrangement is provided which is not shown in the drawings but which includes a sensor which, when activated, indicates to the control arrangement that a portion of milk foam is to be produced. As a result, the control arrangement activates the pump 5 and causes the outlet valve 17 to open. The pump 5 then pumps milk 3 out of the storage container 2 through the heating device 16, where the milk is heated, to the outlet arrangement. Since the milk flows through the aeration device 9, air is introduced into the milk via the air supply line 11 so that the milk is aerated.

The milk which is charged with air is heated in the heating device 16 whereby it is further foamed. The foamed-up milk is first conducted through the first flow resistor 18 in order to even out pressure peaks generated by the pump and then reaches the second flow resistor 28 via the outlet valve 17. When the aerated milk is pressed through the second flow resistor 28, the resistor elements 20a, 20b, 20c are compressed whereby a fine stable milk foam is generated.

It should still be mentioned that the first flow resistor 18 may be omitted if this is desired in particular if the pump 5 generates a uniform pumping pressure.

The invention claimed is:

1. An apparatus (1) for foaming a liquid supplied in a conduit (7) to an outlet arrangement (8), the apparatus comprising: an aerating arrangement (9) disposed in the conduit (7) for mixing air into the liquid, a displacement pump (5) for pumping the aerated liquid from the aerating arrangement (9) to an outlet arrangement (8) for discharging the aerated liquid, the conduit (7) further including at least one flow resistor (18, 28) which is arranged between the displacement pump (5) and a heating device (16) also disposed in the conduit (7) for heating the aerated liquid and which encloses a plurality of adjacent resistor elements (20a, 20b, 20c) which consist of an elastic material and are movable relative to one another with passages for the aerated liquid formed between the resistor elements (20*a*, 20*b*, 20*c*), the at least one flow resistor (18, 28) being provided with a support for the resistor elements (20*a*, 20*b*, 20*c*) by which the resistor elements (20*a*, 20*b*, 20*c*) are supported and against which they are compressed and densified by pressure forces generated by the liquid forced through the at least one resistor (18, 28), wherein the heating device (16) is in the form of a low pressure boiler with a controllable outlet valve (17) arranged between the heating device (16) and the outlet arrangement (8) and the outlet valve (17) is in communication with a control arrangement for maintaining the aerated liquid in the heating device (16) under a pressure of 0.5 bar to 4 bar.

2. The apparatus (1) according to claim 1, wherein the flow resistor (28) is arranged in the outlet arrangement (8).

3. The apparatus (1) according to claim 1, wherein the resistor elements (20*a*) are granular particles.

4. The apparatus (1) according to claim 1, wherein, in the conduit (7) between the pump (5) and the flow resistor (18), a check valve (6) is arranged which permits flow only in a direction from the aerating device (9) to the outlet arrangement (8).

5. The apparatus (1) according to claim 1, wherein the resistor elements (20*c*) are in the form of fibers which are interconnected into an elastically deformable wool.

6. The apparatus (1) according to claim 1, wherein the resistor elements (20*a*, 20*b*, 20*c*) consist of a natural material comprising at least one of coco fibers and hair.

7. The apparatus (1) according to claim 1, wherein the resistor elements (20*b*) are formed by chips or sections of chips which, in a longitudinal direction, have an essentially constant cross-section.

8. The apparatus (1) according to claim 1, wherein the resistor elements (20*a*, 20*b*, 20*c*) consist of plastic comprising at least one of polytetrafluoroethylene, polyoxymethylene and polyamide.

9. The apparatus (1) according to claim 1, wherein the resistor elements (20*a*, 20*b*, 20*c*) are enclosed in the conduit (7) between foraminous plates (21, 24) or sieves which are arranged in the conduit (7) in spaced relationship so as to extend transverse to the longitudinal direction of the conduit (7) and which are movable out of a rest position toward one another for compressing the resistor elements (20*a*, 20*b*, 20*c*), and the foraminous plate (24) which is further remote from the aerating device (9) serves as the support against which the resistor elements (20*a*, 20*b*, 20*c*) are biased when subjected to the pressure of the aerate liquid.

10. The apparatus (1) according to claim 9, wherein the flow cross-section of the inlet end foraminous plate (21) is smaller than the flow cross-section of the outlet end foraminous plate (21) or the outlet end sieve.

11. The apparel (1) according to claim 9, wherein the resistor elements (20*a*, 20*b*, 20*c*) and the foraminous plates (21, 24) are arranged in the interior of a cartridge (19) which is installed removably in at least one of the conduit (7) and the outlet arrangement (8).

\* \* \* \* \*